US 9,940,851 B2

(12) United States Patent
Murray (10) Patent No.: US 9,940,851 B2
(45) Date of Patent: Apr. 10, 2018

(54) SYSTEM AND DEVICE FOR DECLUTTERING A DISPLAY

(71) Applicant: Trimble Inc., Sunnyvale, CA (US)

(72) Inventor: Keith Allan Murray, Philomath, OR (US)

(73) Assignee: Trimble Inc., Sunnyvale, CA (US)

( * ) Notice: Subject to any disclaimer, the term of this patent is extended or adjusted under 35 U.S.C. 154(b) by 703 days.

(21) Appl. No.: 13/796,036

(22) Filed: Mar. 12, 2013

(65) Prior Publication Data

US 2014/0092093 A1    Apr. 3, 2014

Related U.S. Application Data

(62) Division of application No. 11/092,866, filed on Mar. 28, 2005, now abandoned.

(51) Int. Cl.
| | |
|---|---|
| G06F 17/00 | (2006.01) |
| G09B 29/00 | (2006.01) |
| G06F 17/21 | (2006.01) |
| G06F 3/0481 | (2013.01) |
| G06F 17/24 | (2006.01) |
| G06F 3/0482 | (2013.01) |
| G06T 11/60 | (2006.01) |
| G06F 3/0484 | (2013.01) |
| G06T 11/20 | (2006.01) |

(52) U.S. Cl.
CPC ......... *G09B 29/003* (2013.01); *G06F 3/0481* (2013.01); *G06F 3/0482* (2013.01); *G06F 3/0484* (2013.01); *G06F 3/04817* (2013.01); *G06F 17/211* (2013.01); *G06F 17/212* (2013.01); *G06F 17/24* (2013.01); *G06T 11/206* (2013.01); *G06T 11/60* (2013.01); *G09B 29/005* (2013.01)

(58) Field of Classification Search
CPC ...... G06F 17/212; G06F 17/211; G06F 17/24; G06F 3/04842; G06F 3/04817; G06F 3/0481; G06F 3/0484; G06T 11/60; G06T 11/206; G09B 29/00; G09B 29/0053
See application file for complete search history.

(56) References Cited

U.S. PATENT DOCUMENTS

| | | | | |
|---|---|---|---|---|
| 4,875,034 A | * | 10/1989 | Brokenshire | H04N 13/0434 345/419 |
| 5,414,809 A | * | 5/1995 | Hogan | G06F 3/0481 345/440 |
| 5,515,293 A | * | 5/1996 | Edwards | G06F 17/5081 716/55 |
| 6,219,149 B1 | * | 4/2001 | Kawata | G06K 15/02 358/1.11 |
| 6,665,840 B1 | | 12/2003 | Wiley et al. | |

(Continued)

*Primary Examiner* — Cesar Paula
*Assistant Examiner* — David Faber
(74) *Attorney, Agent, or Firm* — Kilpatrick Townsend & Stockton (57) ABSTRACT

A system and device for controlling a display are disclosed. Data is examined, which correspond to an image to be shown with the display. Upon determining that said data comprise a critical item corresponding to an element of the image, the critical item is shown with an uncluttered view. Non-critical items corresponding to elements of the image are attempted to be shown as well, such that the critical item is not obscured and the image remains uncluttered.

8 Claims, 6 Drawing Sheets

(56) References Cited

U.S. PATENT DOCUMENTS

| | | | |
|---|---|---|---|
| 6,940,530 B2 | 9/2005 | Chen et al. | |
| 7,089,110 B2 | 8/2006 | Pechatnikov et al. | |
| 7,131,060 B1 | 10/2006 | Azuma | |
| 7,425,968 B2* | 9/2008 | Gelber | G09B 29/10 345/629 |
| 8,482,582 B2* | 7/2013 | Gelber | G09B 29/10 345/629 |
| 2001/0034588 A1* | 10/2001 | Agrawals | G01C 21/36 703/2 |
| 2003/0229441 A1* | 12/2003 | Pechatnikov | G01C 21/26 701/411 |
| 2004/0027351 A1* | 2/2004 | Kim | G09G 5/24 345/467 |
| 2004/0252137 A1* | 12/2004 | Gelber | G09B 29/10 345/629 |
| 2005/0174596 A1* | 8/2005 | Uchida | G03G 21/04 358/1.14 |
| 2006/0218493 A1* | 9/2006 | Murray | G06F 3/0481 715/210 |
| 2007/0233379 A1* | 10/2007 | Bowman | G01C 21/367 701/431 |
| 2008/0036787 A1* | 2/2008 | Gelber | G09B 29/10 345/619 |
| 2008/0036788 A1* | 2/2008 | Gelber | G09B 29/10 345/619 |
| 2011/0159464 A1* | 6/2011 | Sinclair | G09B 27/08 434/146 |
| 2011/0199370 A1* | 8/2011 | Chiang | G06T 19/00 345/419 |

\* cited by examiner

SYSTEM AND DEVICE FOR DECLUTTERING A DISPLAY

CROSS-REFERENCE TO RELATED U.S. APPLICATION

This application is a divisional application of and claims the benefit of co-pending U.S. patent application Ser. No. 11/092,866 filed on Mar. 28, 2005 entitled "METHOD, SYSTEM AND DEVICE FOR CONTROLLING A DISPLAY" by KEITH MURRAY, and assigned to the assignee of the present application; the disclosure of which is hereby incorporated herein by reference in its entirety.

TECHNICAL FIELD

The present invention relates to display functions. More specifically, embodiments of the present invention relate to a method, system and device for controlling a display.

BACKGROUND

Modern computing, communicating, and other systems are used widely, in many fields and have many, often multiple applications. These systems include computers of various types, some of which are readily portable. For a variety of applications, portability can be a useful attribute and some computer and/or communicating systems that are portable may thus readily execute such applications and some in fact specialize in such applications.

For instance, personal digital assistants (PDAs), cellular telephones (cellphones), laptop, palmtop and other relatively small form factor computers typically perform a general variety of such applications. Further, a variety of portable computer systems are used with relatively specialized functions such as those relating to fields like surveying, construction, cartography, geodesics, agriculture and mining, etc. While some computer systems may not be especially portable, like their portable counterparts they perform a variety of useful applications.

Whether especially portable or not, many modern computer systems display information to their users. They display information on a variety of devices and components, which can use various technologies and media. Typical computer monitor devices include the cathode ray tube (CRT), an especially well-established technology, cold cathode or thin CRTs, thin film transistors, and liquid crystal display (LCD) devices, components, etc.

Small form factor, lightweight, low power consumption, and other considerations can be desirable attributes of particular display devices or components for portable computing and/or communication systems. Thus, display devices or components for portable computer/communication systems tend to be relatively small in comparison for instance with many typical desktop computer monitors. Efficient use of display area is however generally beneficial for most display device/components.

Further, while perhaps efficiently designed for a specific function set, role, etc., where compared with substantially stationary systems such as desktop PCs and workstations, portable computers may have less processing and memory capacity and other more generalized computing resources and capability. For instance, while portable electronic surveying computer devices and cell phones are especially efficient at mapping and plotting surveying data, and at communicating and networking, respectively, their processors and memory capacity may be more limited that a variety of PCs. For portable and other computing/communication systems with such relatively limited available computing resources, display area use efficiency can thus also be significant.

With the relatively small displays and computing capability associated with portable computing systems, efficient use of their available display area can be a significant consideration for an application. In fact, whether a host computer system is readily portable or not, many applications can display information more effectively thereon where the application can make efficient use of a display device/component's available display area. Thus while some of the following discussion refers to an exemplary portable computer system/device, etc., this reference is exemplary. This reference exemplifies computer/communication systems in general, whatever their relative degree of portability.

An exemplary surveying application that is run on a computer platform may display a map. The map has a variety of features, which include a labeled graphical rendition or representation of a given geographical location, area, etc., hereinafter referred to as a "graphical geo-representation." The map can also include various markers such as reference points, textual and symbolic annotations, surveying marker and/or reference points (e.g., related to a specific geographical location represented by the map's geo-representation), other symbols, text and the like.

These displayed markers are typically intended to provide to a user significant information relating to the map displayed, the application generating the display and/or the computer platform upon the display unit of which the map is rendered. Typically, these markers are superimposed on the graphical geo-representation. However, textual and symbolic information and/or graphical text and symbol fields corresponding to these markers can occlude and obfuscate each other, features of the geo-representation, and/or clutter, in some situations considerably, the graphical geo-representation.

The user may be confused by this clutter and obfuscation. The user may also be unable to visually access the obfuscated portions of the geo-representation. Further, the user may be unable to decipher displayed, perhaps significant textual information that is cluttered with other text, graphical field boxes and/or other displayed information.

Graphical clutter and obfuscation of a computer display such as is exemplified above is not an issue that is limited to map displays. In the display of webpages, text, images, portable and other documents and a variety of other graphics, graphical clutter and obfuscation such as is exemplified above can occur as well. Further, such graphical clutter and obfuscation is not an issue that limited to only surveying applications, nor to portable computing/communication devices.

Graphical clutter and obfuscation can confront an array of different applications that display information and can reduce the information display efficiency of desktop monitors, television screens of any type, including large screen, projection, and image wall types, as well as the relatively small display units typical of portable computer/communication devices.

Graphical clutter and obfuscation can interfere with and reduce an application's efficient display of information on a map or other graphical information rendition. Reduction in display efficiency can cause confusion, delay, and cost. Thus, graphical clutter and obfuscation can detract from the usefulness of an application and/or a computer/communication system display.

SUMMARY

Accordingly, what is needed is a method, system and/or device for controlling a display which deters graphical clutter and obfuscation. What is also needed is a method, system and/or device for controlling a display, which supports an application's efficient display of information on maps and/or other graphical information renditions. Further, what is needed is a method, system and/or device for controlling a display which increases the usefulness of an application and deters confusion, and saves time and cost.

A method, system and device for controlling a display are disclosed. The method, system and device control the display so as to deter graphical clutter and obfuscation. Embodiments of the present invention also control displays so as to support an application's efficient display of information on graphical information renditions including maps, webpages, textually and/or graphically based or containing documents and others. Further, embodiments of the present invention control displays so as to increase the usefulness of an application, deter confusion, and save time and cost.

In one embodiment, data is examined, which correspond to an image to be shown with the display. Upon determining that said data comprise a critical item corresponding to an element of the image, the critical item is shown with an uncluttered view. Non-critical items corresponding to elements of the image are attempted to be shown as well, such that the critical item is not obscured and the image remains uncluttered.

DETAILED DESCRIPTION

A method, system and device for controlling a display are described. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention.

Portions of the detailed description that follows are presented and discussed in terms of processes. Although steps and sequencing thereof are disclosed in figures herein (e.g., FIGS. 3 and 6) describing the operations of processes (e.g., process 30, and 600 respectively), such steps and sequencing are exemplary. Embodiments of the present invention are well suited to performing various other steps or variations of the steps recited in the flowchart of the figure herein, and in a sequence other than that depicted and described herein. In one embodiment, such a process is carried out by processors and electrical and electronic components under the control of computer readable and computer executable instructions comprising code contained in a computer usable medium.

Embodiments of the present invention provide a method, system and device for controlling a display, in one embodiment, data is examined, which correspond to an image to be shown with the display. Upon determining that said date comprise a critical item corresponding to an element of the image, the critical item is shown with an uncluttered view. Non-critical items corresponding to elements of the image are attempted to be shown as well, such that the critical item is not obscured and the image remains uncluttered.

Therefore, a method, system and device for controlling a display are provided wherein graphical clutter and obfuscation, which can interfere with and reduce an application's efficient display of information on a map or other graphical information rendition, are deterred. Embodiments of the present invention support an application's efficient display of information on maps and/or other graphical information renditions. Embodiments of the present invention increase the usefulness of an application and deter confusion, and save time and Embodiments of the present invention are disposed to function with a computer and/or communication device, apparatus, system, etc. platform (referred to herein as computer/communication system") which has an associated display devices, monitors, etc. Embodiments of the present invention are well suited to be practiced on a variety of such platforms including (but not limited to) laptops, PDAs, cellphones, surveying computers, geo-locating and mapping devices such as hand held GPS units, so called hand held, pocket and palmtop computers, desktop PCs, workstations, etc. Embodiments of the present invention allow such platforms to efficiently control a display. Embodiments of the present invention are well suited to control a variety of types of such displays including (but not limited to) thin film transistor array displays, LCDs, thin, cold cathode and other CRTs, etc., on relatively small displays, integrated with the computer/communication system or a separate monitor, television screen, etc.

Exemplary Displays

Figure 1:
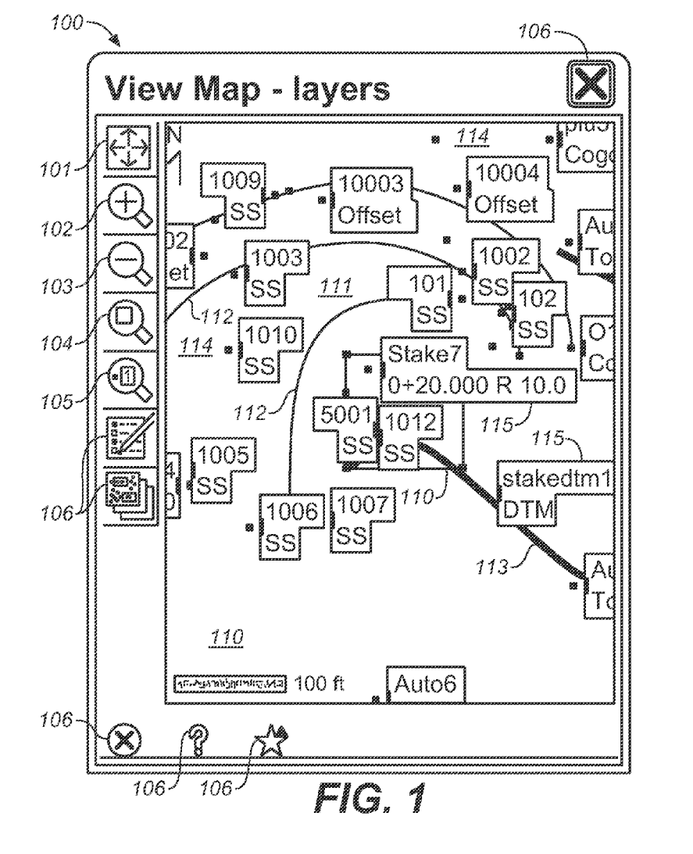
FIG. 1 depicts a first screen shot from an exemplary display disposed to function with a computer/communication system.

FIG. 1 depicts a first screen shot from an exemplary display 100. Display 100 is disposed to function with a computer/communication system. The screen shot displays a map 110. Map 110 represents some geographic area, which the user of the computer/communication system has selected to display, such as by entering, selecting, or otherwise specifying geographical coordinates corresponding to boundaries of the geographic area.

Graphical imagery 111 corresponds to this geographic area, thus representing the area to the user visually in display 100, Such representational map imagery comprises a graphical gee-representation. Contour lines 112 and other features 113 allow geo-representation 111 to reveal elevations and other geographic and other features that may characterize the represented geographical area.

A variety of points 114 on geo-representation 111 are added to display 100 automatically and/or with user action. The points 114 allow the user of map 110 to mark positions, stakes, features and the like which correspond to some geographic location, survey point, etc, of particular interest. Those of points 114 that are especially significant to a user can be flagged as critical points. One such significant point for instance can represent the starting point of a survey, expedition, etc., such as the point marked (and arranged) as:

"1

Start"

(in the 'L' shaped field near the lower left hand corner of cursor 107).

Fields 115 each correspond to one of points 114. Fields 115 are displayed proximate to each of their respective points 114. Fields 115 display to the user textual, symbolic, and/or other information relating to each of their respective corresponding points 114. For instance, text and/or other symbols within fields 115 label, name, describe, etc. their respective points 114 and/or geographic features proximate thereto.

A set of functional graphical user interface (GUI) display features 101-106 are arrayed in a convenient location such as a side or other border of display 100. Display features 101-106 allow the user to interactively interface with the display 100. For instance, display feature 101 can be actuated to allow the user to move a cursor 107, Display feature 102 and 103 can be activated to each change the size of the portion of represented geographic area depicted with map 110 or selected with (e.g., bounded graphically with) cursor 107, such as to respectively zoom in or out (e.g., effectively changing in either direction the boundaries of the displayed information within cursor 107 or map 110), call for display of markers applicable thereto, etc. Display feature 104 allows a portion of the display to be visually changed so as to render it more legible, viewable, etc. Thus, display feature 104 effectively functions as a display graphics virtual magnifier.

While map 110, as depicted in the screen shot of FIG. 1 appears to display its graphical information effectively, where more textual or symbolic ("text based") information is to be displayed, the display efficiency can decrease. For instance, where so much text based information is available to be displayed, clutter can occur.

Figure 2:
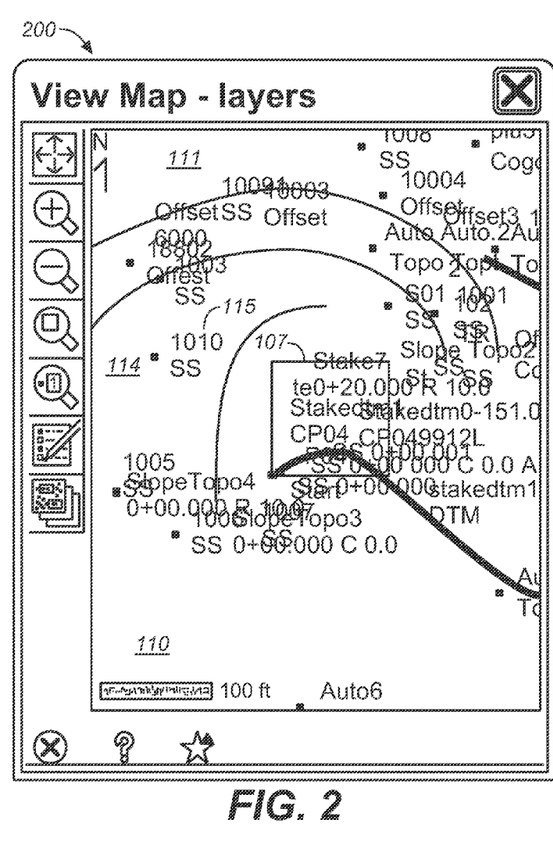
FIG. 2 depicts a second screen shot from an exemplary display disposed to function with a computer/communication system.

FIG. 2 depicts a second screen shot from an exemplary display 200, which is disposed to function with a computer/communication system. This screen shot also displays map 110, such as discussed above with reference to FIG. 1.

Textual and/or symbolic information (text) is written directly upon the geo-graphical representation 110 or in fields 115. However, so much such text based information is presented proximate to their respective points 114 that their own display, as well as significant portions of geo-representation 110 are cluttered.

In fact, as seen in several regions of map 110 here, text or text fields 115 occlude and obfuscate other text or text fields 115, rendering much of the text illegible or parts of fields 115 occluded, e.g., in the region surrounding cursor 107. Even where critical points are marked, significant information about them such as their label and/or name can be effectively unavailable, legibly, to a user. For instance, the label corresponding to the critical point

"1

Start"

referred to above is occluded and rendered substantially illegible by the cluttered text in and around the cursor 107.

The result is seen in the screen shot of FIG. 2 as a display that is at best confusing. So much information displayed that a significant part thereof is effectively unavailable (e.g., illegible) to a user trying to read the text, identify its corresponding point, or the like.

Exemplary Method

Figure 3:
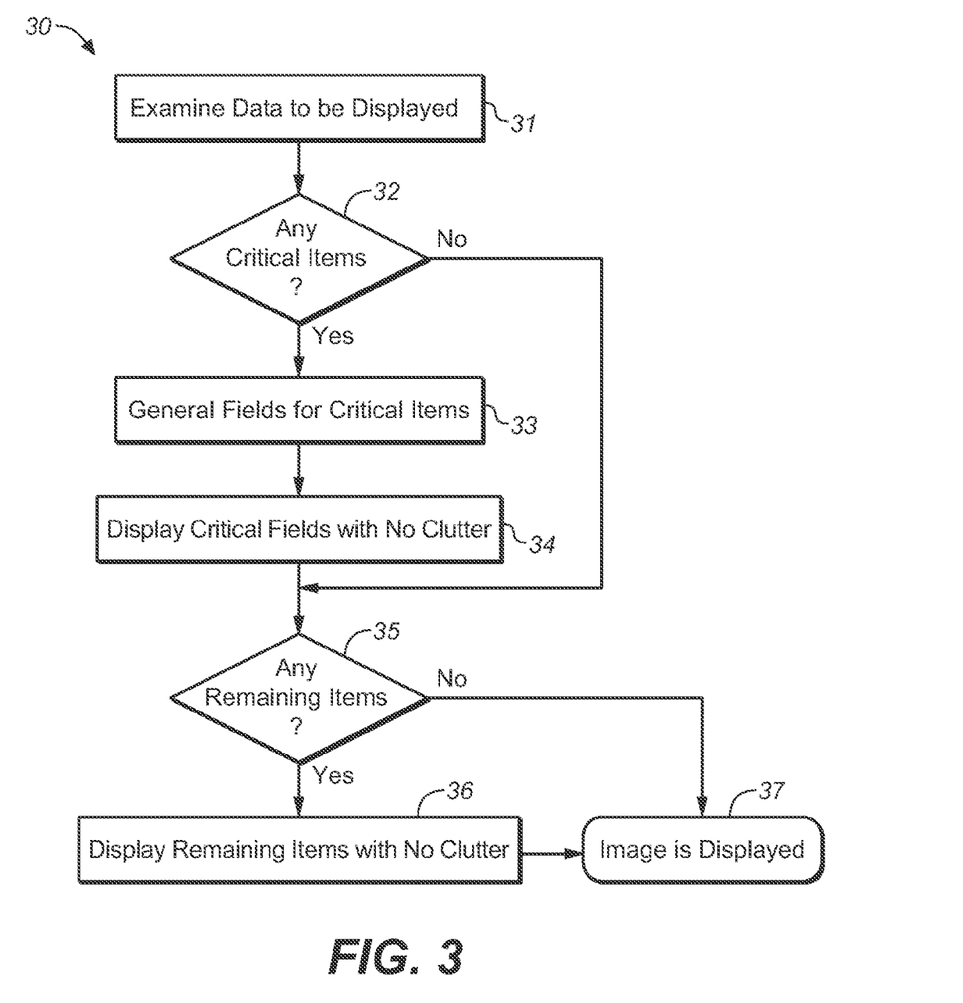
FIG. 3 is a flowchart of an exemplary computer based process for controlling a display, according to an embodiment of the present invention.

FIG. 3 is a flowchart of an exemplary computer based process 30 for controlling a display, according to an embodiment of the present invention. Process 30 begins with step 31, wherein graphical data corresponding to an image to be displayed is examined.

Such graphical data can comprise a map, a webpage, a document, a picture, etc. that is to be displayed on a display unit associated with a computer/communicating system. In one embodiment, such data is accessed with a display control tool from the graphics display interface (GDI) or a similarly functional graphics related application program interface (API) of an operating system (OS) running on a processor of the computer/communicator.

In step 32, it is determined whether these data comprise any critical items, the display of which is especially significant for the image being displayed. If so, in step 33, fields corresponding to the critical items are generated, graphically arranged so as to be shown uncluttered (e.g., with no clutter).

In one embodiment, items in the display are either critical or non-critical. In examining the data corresponding to an image to be displayed, criticality is assigned to an item based on its significance to the application that is showing the display. For instance, in an application related to surveying, geodesies, cartography and the like, points such as an 'occupy point', a 'backsight point', 'GPS control points' and other are, under some circumstances, assigned criticality for display. In a graphical creativity application, under some circumstances points such as 'anchor point', 'center point' and 'focus point' are assigned criticality. In a word processing application, points assigned criticality under some circumstances include points of editorial and drafting significance. Other applications assign criticality to display items based on criteria and parameters significant to that application.

In step 34, the critical items are shown with an uncluttered view (e.g., so that they are not obscured, occluded, or obfuscated with another critical item or with any other item on the display).

Upon showing the critical items free of clutter (or if no critical items were to be displayed), it is determined in step 35 whether any other (e.g., other than critical) items remain to be displayed, if so, in step 36, the remaining items are displayed with no clutter, wherein the remaining items are graphically arranged so that they do not obscure, occlude, or obfuscate any critical item or any other item on the display, including each other. In one embodiment, where a non-critical item cannot be shown without cluttering the image, such as wherein a view of a critical item's field is obscured, occluded, or obfuscated with the non-critical item, the non-critical item is withheld from being shown.

In one embodiment, the critical and non-critical items comprise region objects associated with the GDI of an OS. Exemplary OS platforms with which various embodiments of the present invention can function include, but are not limited to, Windows™ (e.g., WindowsCE™, Microsoft Pocket PC™, Windows Mobile™, Windows Mobile for Smart Phones™; all commercially available from Microsoft, a corporation in Redland. Wash.). Other platforms with which various embodiments of the present invention can function include non-Windows based OSs and those available from elsewhere, than as named above.

The resulting image of graphical data, such as the map, are then displayed in step 37 in such a way that all graphical items displayed are shown uncluttered, unobscured, unoccluded, and not obfuscated.

Exemplary Display

Figure 4:
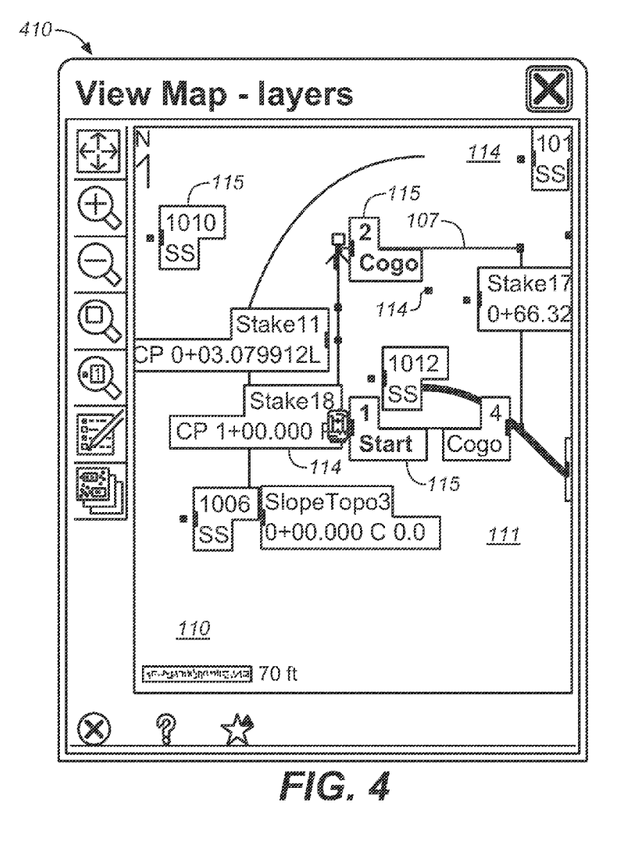
FIG. 4 depicts a third screen shot from an exemplary display disposed to function with a computer/communication system, according to an embodiment of the present invention.

FIG. 4 depicts a third screen shot from an exemplary display 410 disposed to function with a computer/communication system, according to an embodiment of the present invention. This screen shot also displays map 110, such as discussed above with reference to FIGS. 1 and 2. In contrast to FIG. 2, map 110 clearly displays the geo-representational area 111 with some of points 114 and their respective labels (e.g., text/symbol based marker fields) 115, free of unwanted clutter. In one embodiment, map 110 is rendered on display 410 with a process for controlling a display like process 30, described above with reference to FIG. 3.

For instance, significant points such as the critical point 114, with its associated label 115, a text field labeled as described above:

"1

Start"

(now in FIG. 4, displayed effectively proximate to the center, with its associated 'L' shaped label field) are processed for display prominently and/or with priority, for instance corresponding to its criticality. Non-critical text fields 115 are then arranged automatically so as not to obscure, occlude, and/or obfuscate the critical text field and/or each other, in some instances, non-critical text fields are not displayed. The information they would otherwise display is of course available to a user with an input to so adjust the display.

However, as shown in FIG. 4, exemplary display 410 efficiently displays graphical information without clutter. The display 410 presents a user with a clear and uncluttered view of much of the imagery of geo-representation 111, the critical point label and a useful number of non-critical markers as well, graphically spaced with beneficial efficiency.

Exemplary System

Figure 5:
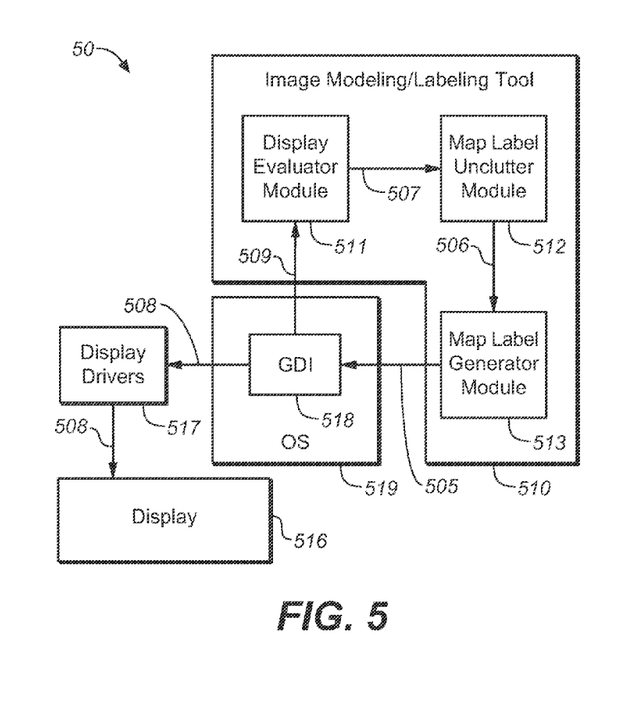
FIG. 5 depicts an exemplary computer based system for controlling a display, according to an embodiment of the present invention.

FIG. 5 depicts an exemplary computer based system 500 for controlling a display, according to an embodiment of the present invention. In one embodiment, system 500 performs a process for controlling a display like process 30, described above with reference to FIG. 3.

Display drivers 517 graphically write data 503 corresponding to an image on display unit 516, as directed with GDI (or other similarly functional graphics API) 518 of OS 519. Information 509 relating to these data is accessed with an image modeling and labeling tool 510. In one embodiment, information 509 includes region objects associated with GDI 518.

Display evaluation module 511 evaluates information 509 and flags certain of them as relating to a critical point, e.g., in the image to be displayed. Other data are identified as corresponding to non-critical points.

Image uncluttering module 512 handles these evaluated data 507, e.g., with respect to their criticality and prioritizes their display related processing such that critical display data are given relatively greater space priority than non-critical display data.

Image label generator module 513 handles these prioritized data 506 and formats them for efficient graphical presentation, according to their priority. Where they cannot be displayed without causing clutter (e.g., obscuring, occluding, and/or obfuscating a critical item or another (e.g., already selected) non-critical item, certain non-critical items will be remembered (e.g., for later viewing, dropping permissions, etc.), but their instant display are effectively suppressed, e.g., system 500 withholds them from being displayed.

GDI 318 accesses these graphically formatted data 505 and directs display drivers 517 according to their format. The corresponding graphical image displayed with display unit 516 is free of clutter.

Exemplary Method

Figure 6:
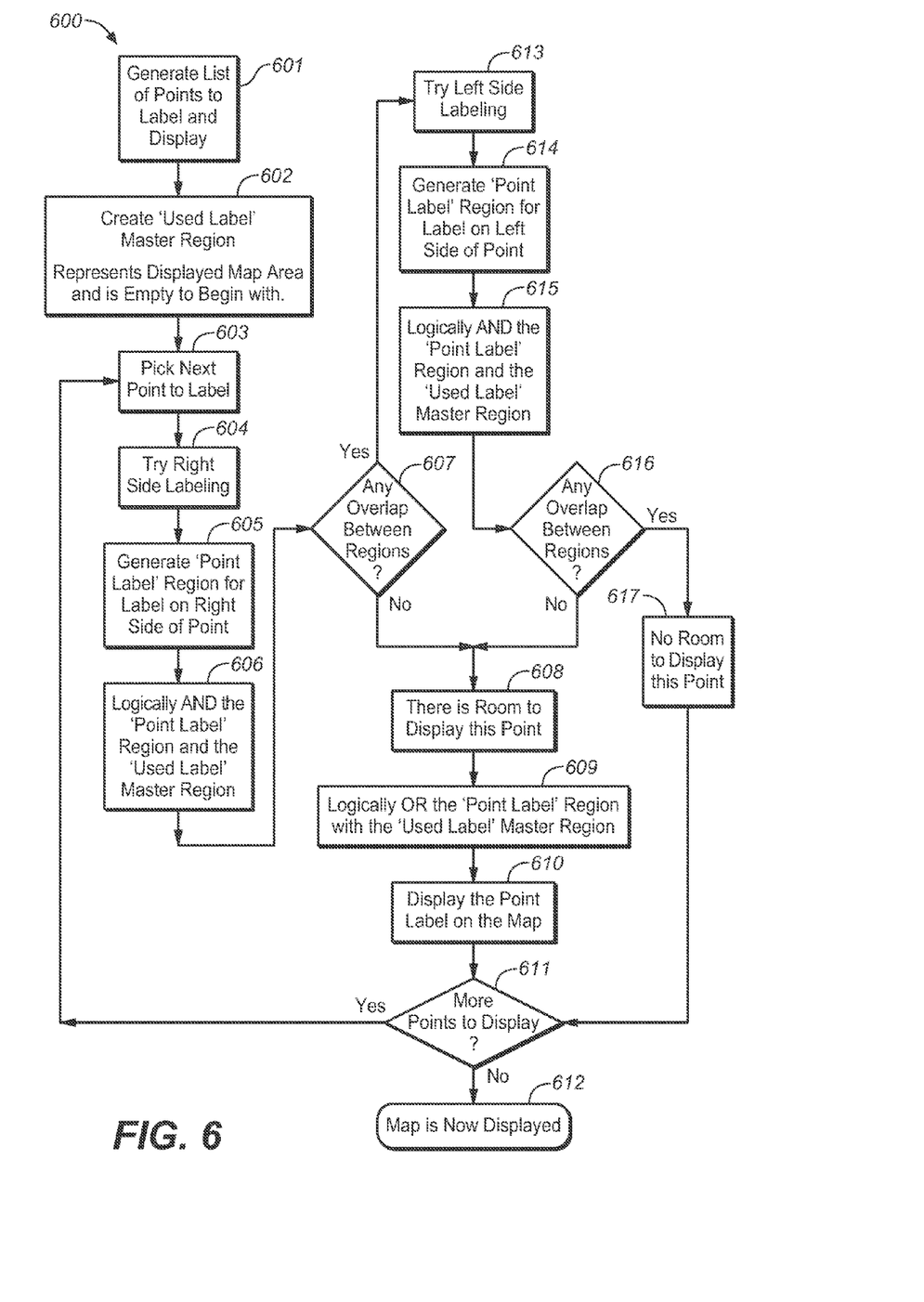
FIG. 6 is a flowchart of an exemplary computer based process for deterring graphical clutter and obfuscation in a display, according to an embodiment of the present invention.

FIG. 6 is a flowchart of an exemplary computer based process 600 for deterring graphical clutter and obfuscation in a display, according to an embodiment of the present invention. In one embodiment, process 600 comprises a function similar to that described for one or more modules of image modeling and labeling tool 510, e.g., graphical uncluttering module 512, which are described above with reference to FIG. 5. In one embodiment, information relevant to the performance of process 600 is accessed from a GDI, etc. of the OS driving the display. In one such embodiment, this information comprises region objects associated with the GDI.

Process 600 begins with step 601, wherein a list is generated of points to label and display. In step 602, a 'Used Label' master region is created, which represents the graphical area (e.g., maps to the image to be) displayed. In one embodiment, this master region is initially empty (e.g., devoid of data to be displayed).

In step 603, a point to be labeled is selected. In one embodiment, critical points are selected with priority over points that are other than critical. A point comprises a symbol, which corresponds to (e.g., represents, symbolizes, etc.) one of various features that characterize the graphical image to be displayed. For instance, where the graphic to be displayed comprises a map, points correspond to geographical locations, navigational fixes, coordinates corresponding to a geographical position, etc.

In step 604, process 600 attempts to label (e.g., generate a corresponding labeling text field for potential display with) the selected point to one of its sides. In one implementation, process 600 attempts to label the point to its right side (e.g., as it is displayed, formatted for display, etc) of the point.

In step 605, a 'point label' region is generated, which corresponds to this label, to the selected, e.g., right side of the point. In step 606, the generated point label region is subjected to a logical 'AND' operation together with the 'used label' master region.

In step 607, the resulting developing graphical display precursor is evaluated to determine whether there is any overlap between regions. If regions do not overlap, then in step 608, process 800 commits to room existence, e.g., within the display area, to display the selected point and e.g., its corresponding label.

In step 609, the 'point label' region is subjected to a logical 'OR' operation with the 'used label' master region. In step 610, the point label is displayed (e.g., added to the developing display data, etc.) and data relating to the 'used label' master region is correspondingly updated.

In step 611, it is determined whether there are additional points to be displayed. If not, then in step 612, the graphical representation formed is displayed. For instance, where the graphic comprises a map, the graphical geo-representation is displayed with the selected point and its corresponding label to generate the map. Process 600 can be complete at this point.

However, where an overlap between regions was determined to exist in step 607, process 600 proceeds with step 613, wherein an attempt is made to label the selected point to its side opposite to that first selected (e.g., in step 604). Thus, in the present exemplary implementation, in step 613 an attempt is now made to label the point to its left side.

In step 614, a 'point label' region is generated, which corresponds to this label, to the left side of the point. In step 615, the generated point label region is subjected to a logical 'AND' operation together with the 'used label' master region.

In step 616, the resulting developing graphical display precursor is evaluated to determine whether there is any overlap between regions. If regions do not overlap, then process 600 proceeds with step 608, which is described above. If however it is determined that no room exists to display the selected point, e.g., without cluttering the display, obscuring, occluding, and/or obfuscating another point or its label, then in step 617 process 600 commits to insufficient room existence to display the selected point, its corresponding label, etc. and proceeds with step 611, as discussed above.

Exemplary Device

Figure 7:
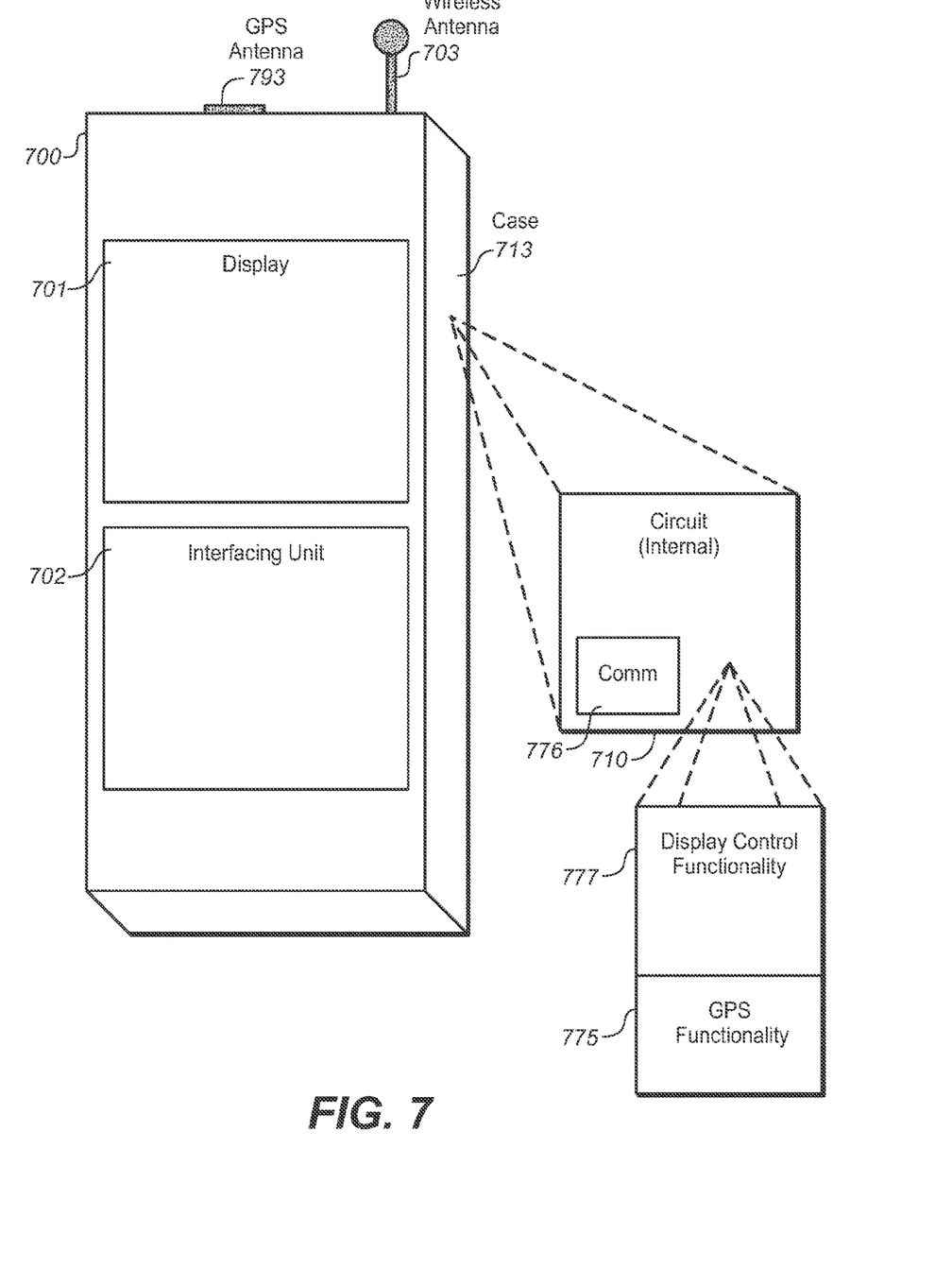
FIG. 7 depicts an exemplary computer/communicator platform wherein are disposed computer/communication systems, which control a display, according to an embodiment of the present invention.

FIG. 7 depicts an exemplary computer/communication (computer) device 700, according to an embodiment of the present invention. Computer device 700 exemplifies a platform upon (e.g., within, etc.) which embodiments of the present invention are disposed. In various embodiments, computer device 700 has unique features and characteristics that can vary from other embodiments. For instance, in some embodiments computer device 700 comprises a portable computer and in other embodiments, a relatively less stationary computer. In various embodiments, computer device 700 comprises a laptop computer, a PDA, a specialized computing device of some type such as a surveying computer, a cellphone, a geo-locating and/or mapping computer device such as a hand held GPS unit, a small form factor, lightweight computer such as a hand held, pocket and palmtop computer, a desktop PC, a workstation, and a portable web browser. Although computer device 700 is depicted as a hand held computer/communicating system such as a cellphone, surveying computer, PDA, etc., other computers, including relatively less portable types, are exemplified and described therewith.

Computer device 700 controls a display unit 701. In various embodiments, display unit 701 is integrated with computer device 700, for instance with and/or within a common package. For example, in an embodiment wherein computer device 700 comprises a laptop computer and/or one of some kinds of cellphones, display 701 "flips" open therefrom for use. In embodiments wherein computer device 700 comprises a surveying computer, a mapping computer, a geo-positioning computer, a PDA, and/or one of other kinds of cellphones, display unit 701 is integral with the hand held casing in which computer device 700 itself is disposed, as depicted herein.

In other embodiments, display 701 is physically separable from computer device 700, yet coupled thereto for transfer of data to be displayed by a cable, wirelessly, etc. For example, in an embodiment wherein computer device 700 comprises a desktop computer such as a PC and/or a workstation, display 701 comprises a monitor, a computer controlled television screen, etc.

In various embodiments, display types (e.g., technologies, etc.) are unique with respect to other embodiments. In various embodiments, display 701 comprises thin film transistor array displays, LCDs, thin, cold cathode and other CRTs, and other types. Display 701 provides graphical, visual, etc. Information to a user such as images, e.g., comprising pixels, etc. and achieves effective resolution, chrominance, luminance, etc., and in some implementations may be reflective, backlit, etc. In one implementation, display 701 comprises a lightweight, low power consumption, etc, display device.

Computer device 700 is housed in a sturdy case 713 made of a protective material such as plastic, etc. Computer device 700 has an interface unit 702 for allowing a user to interface therewith, e.g., for operational, data entry, etc. functions. Interface unit 702 comprises, in one implementation, an alphanumeric input device such as a telephone keyboard, a small form factor 'QWERTY' or other keyboard, an electromechanically actuated notepad device, buttons, knobs, switches etc. In one implementation, interface unit 702 operates with display 701 to allow graphical user interface (GUI) functionality, e.g., with interactive windows, fields, screen 'buttons', icons, etc. displayed thereon, such as shown in FIGS. 1, 2 and 4 herein.

Computing/communicating circuitry 710 within case 713 provides functionality for computer device 700, An antenna 703 (e.g., coupled with internal circuit 710), which can be retractable (e.g., into the inside of case 713) allows computer device 700 to function wirelessly, e.g., for communicating with a network. An antenna 793 allows computer device 700 to access signals from the GPS or another geo-locating system, etc. Graphical data such as maps, documents, photographs, etc, like other information, are displayed to the user on display 701, which is controlled with circuit 710.

Figure 8:
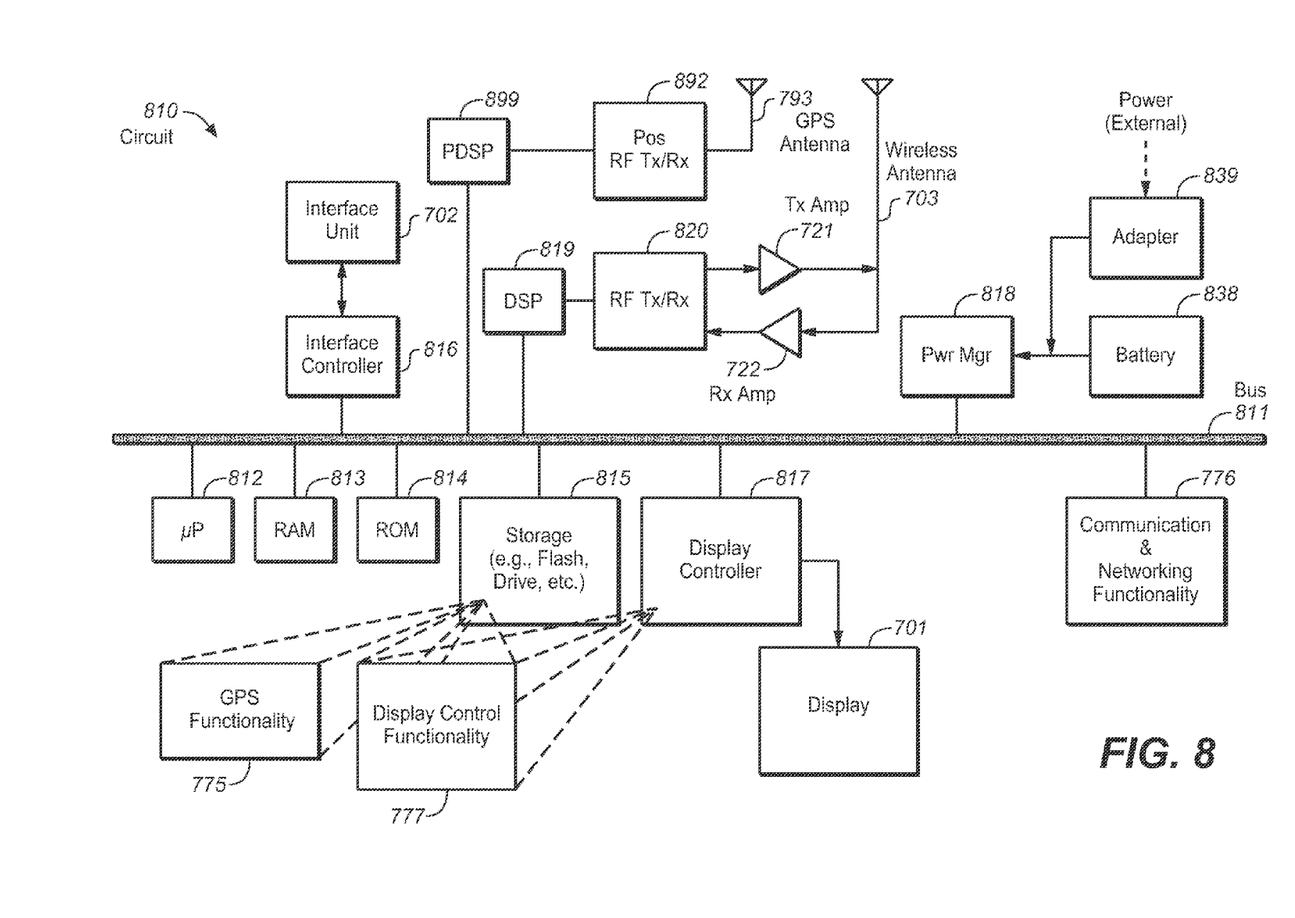
FIG. 8 depicts an exemplary computer/communication system, which controls a display, according to an embodiment of the present invention.

Circuit 710 also comprises display control functionality 777 for controlling the information displayed on display 701. In one embodiment display control functionality 777 is software based and programmed into components of circuit 710. In one embodiment, circuit 710 also comprises GPS and/or other geo-locating functionality 775, which in one embodiment is software based and programmed into components of circuit 710. Circuit 710 has a communication and networking functionality 776 in one embodiment, which allows computer device 700 to function as a cellphone, web browser, etc. In one embodiment, circuit 710 is similar in structure and function to circuit 810, described below.

In some embodiments, factors contributing to the utility of computer device 700 include portability, anytime usefulness in all manner of places in almost any conceivable circumstance, and more recently, versatility with various applications. In one embodiment, the display control functionality of computer device 700 is provided with a modular system (e.g., system 500; FIG. 5), which can be implemented in software, hardware, firmware and/or any combination of same. Such software comprises, in one embodiment, a computer readable medium having encoded therein (e.g., thereon, etc.) a code for causing a computer system to perform a method for controlling display 701. Modules comprising the system for controlling display functionality in one embodiment include components of circuit 710, programmed configurations of such components, and/or code stored with such components, etc.

Exemplary Circuit

FIG. 8 depicts an exemplary circuit 810, according to an embodiment of the present invention. In one embodiment, circuit 810 is similar in structure and function to circuit 710, described above. Circuit 810 provides a variety of functionality to computer device 700 (FIG. 7), which performs a computing and/or communication function, A processor (e.g., a microprocessor) 812 operates, in one embodiment, with a digital signal processor (DSP) 819 and a radio frequency (RF) transceiver (Tx/Rx) 820, which provide the communications functionality. Processor 712 further operates with positioning DSP 899 and positioning RF Tx/Rx 892, which provide positioning functionality.

RF Tx/Rx 820 is coupled to antenna 703 with a pair of amplifiers 321 and 822. Transmission amplifier 821 amplifies an output of RF Tx/Rx 820 to propagate an RF signal with the antenna 803. Receiving amplifier 822 amplifies signals such as cellular telephone signals accessed with antenna 703 to provide an amplified input corresponding thereto to transceiver 820. Positioning RF Tx/Rx 892 is coupled to GPS antenna 793 for accessing a GPS signal or a similar positioning signal. It should be appreciated that a pair, or another configuration, of RF amplifiers (not shown) similar to amplifiers 821 and 822, but designed and configured to operate at the frequencies corresponding to GPS type signals, can intercouple the positioning RF Tx/Rx 892 to GPS antenna 793, Transmission amplifier 321 amplifies an output of RF Tx/Rx 820 to propagate an RF signal with the antenna 703. Receiving amplifier 822 amplifies signals such as cellular telephone signals accessed with antenna 703 to provide an amplified input corresponding thereto to transceiver 820. Thus, in some embodiments, circuit 810 allows system to couple with a cellular telephone system, a GPS and/or another geo-locating determination and reporting system.

Battery 838 provides power to circuit 810 with power manager 818, which functions with microprocessor 812 to manage power consumption, conservation, protection, etc. for circuit 810 (and e.g., computer device 700; FIG. 7). An adapter 839 allows power to be drawn from an external source for circuit 814 and, with power manager 818, allows battery 838 to be charged, recharged, etc.

Display controller 817 operates with microprocessor 812 to control display 701 and e.g., data displayed thereon. In one embodiment, functions of display controller 817 are disposed within microprocessor 812. In one embodiment, display controller 817 comprises one or more components of a system for controlling a display, such as system 500 (FIG. 5). In one embodiment, elements of display control functionality 777 are disposed, within display controller 817. In one embodiment, elements of display control functionality 777 are disposed within display controller 817 and/or a storage medium 815. In one embodiment, elements of display control functionality 777 are disposed within display controller 817, storage medium 815, and/or processor 812. Such elements of display control functionality 777 comprise, in various embodiments, programmed code and components.

Interface controller 816 operates with microprocessor 812 to control interface 702, with which a user can interface with the computer functionality of circuit 810.

Communicating and networking functionality 776 comprises, in various embodiments, circuitry and programming which allow computer device 700 for instance to function as a cellphone. In other embodiments, communicating and networking functionality 776 comprises circuitry and programming which allow circuit 810 to perform a modulator/demodulator (modem) and networking function, e.g., for a desktop or similar computer system (e.g., computer device 700; FIG. 7).

Random access memory (RAM) 813 functions with microprocessor 312 to provide a memory workspace for computing processes carried out with microprocessor 312. A read-only memory (ROM) 814 handles basic input/output system (BIOS) functions with microprocessor 812 and provides pre-programmed boot and/or other code to the microprocessor 812.

Storage medium 815 comprises, in one exemplary implementation, a flash memory structure for storing programming code such as relate to display control, communications, networking, computing, and/or geo-location functionality for use with microprocessor 812, as well as data stored by a user, e.g., of computer device 700. In one embodiment, geo-locating functionality programmed into storage (e.g., flash) 315 comprises GPS functionality 775 (FIG. 7). In one embodiment, GPS functionality 775 functions with another geo-location system; e.g., in addition to or instead of the GPS. In one embodiment, storage medium 815 comprises a hard disk drive device, another magnetic media drive device and/or an optical media drive device such as compact disk (CD), digital versatile disk (DVD), Blueray™, etc.

In summary, embodiments of the present invention provide a method, system and device for controlling a display. In one embodiment, data is examined, which correspond to an image to be shown with the display. Upon determining that said data comprise a critical item corresponding to an element of the image, the critical item is shown with an uncluttered view. Non-critical items corresponding to elements of the image are attempted to be shown as well, such that the critical item is not obscured and the image remains uncluttered.

Embodiments of the present invention described above thus relate to a method, system and device for controlling a display. While the present invention has been described in particular exemplary embodiments, the present invention should not be construed as limited by such embodiments, but rather construed according to the following claims and their equivalents.

What is claimed is:

1. A method for controlling a display, said method comprising:

accessing data corresponding to an image to be shown with said display and generating a list of points and labels corresponding thereto wherein said points and said corresponding labels comprise elements of said image, wherein said image is a graphical display of a geographic area;

assigning a criticality to each of said points, wherein said criticality is either critical or non-critical;

creating a used label master region that represents said graphical display of said geographic area, wherein said used label master region is initially devoid of used label data;

generating a precursive map for said image by accessing said list and attempting a fit for each of said points and said labels corresponding thereto into said precursive map, wherein generating said precursive map includes:

determining that a first point of said points is a critical point, said first point having a corresponding first label;

selecting said first point;

selecting a first side of said first point;

generating a first point label region comprising said first point and said first label positioned at said first side;

subjecting said first point label region to a logical AND operation with said used label master region to determine that there is no overlap between regions;

adding said first point and said first label to said precursive map;

updating said used label master region by subjecting said first point label region to a logical OR operation with said used label master region;

after updating said used label master region, determining that a second point of said points is a non-critical point, said second point having a corresponding second label;

selecting said second point;

selecting a second side of said second point;

generating a second point label region comprising said second point and said second label positioned at said second side; and     subjecting said second point label region to a logical AND operation with said used label master region to determine that there is overlap between regions; and accessing said precursive map and formatting said image to be shown with said display.

2. The method of claim 1 wherein said accessing data corresponding to an image to be shown with said display comprises accessing said data corresponding to an image from a graphical display interface of an operating system.

3. The method of claim 1 wherein said data corresponding to said image comprises a region object.

4. The method of claim 3 wherein said region object comprises data generated with a graphical device interface disposed within an operating system.

5. A computer device, comprising:
a protective case;
a display;
a processor; and
a non-transitory computer-readable medium for storing code for causing said computer device to perform a method for controlling said display, said method comprising:

accessing data corresponding to an image to be shown with said display and generating a list of points and labels corresponding thereto wherein said points and said corresponding labels comprise elements of said image, wherein said image is a graphical display of a geographic area;

creating a used label master region that represents said graphical display of said geographic area, wherein said used label master region is initially devoid of used label data;

generating a precursive map for said image by accessing said list and attempting a fit for each of said points and said labels corresponding thereto into said precursive map, wherein generating said precursive map includes:

determining that a first point of said points is a critical point, said first point having a corresponding first label;

selecting said first point;

selecting a first side of said first point;

generating a first point label region comprising said first point and said first label positioned at said first side;

subjecting said first point label region to a logical AND operation with said used label master region to determine that there is no overlap between regions;

adding said first point and said first label to said precursive map;

updating said used label master region by subjecting said first point label region to a logical OR operation with said used label master region;

after updating said used label master region, determining that a second point of said points is a non-critical point, said second point having a corresponding second label;

selecting said second point;

selecting a second side of said second point;

generating a second point label region comprising said second point and said second label positioned at said second side; and     subjecting said second point label region to a logical AND operation with said used label master region to determine that there is overlap between regions; and accessing said precursive map and formatting said image to be shown with said display.

6. The computer device of claim 5 wherein said accessing data corresponding to an image to be shown with said display comprises accessing said data corresponding to an image from a graphical display interface of an operating system.

7. The computer device of claim 5 wherein said data corresponding to said image comprises a region object.

8. The computer device of claim 7 wherein said region object comprises data generated with a graphical device interface disposed within an operating system associated with said computer device.

* * * * *